US008457598B2

(12) United States Patent
Korhonen et al.

(10) Patent No.: US 8,457,598 B2
(45) Date of Patent: Jun. 4, 2013

(54) AUTHENTICATION IN MOBILE INTERWORKING SYSTEM

(75) Inventors: Jouni Korhonen, Riihimäki (FI); Sami Ala-Luukko, Helsinki (FI)

(73) Assignee: TeliaSonera AB, Stockholm (SE)

( * ) Notice: Subject to any disclaimer, the term of this patent is extended or adjusted under 35 U.S.C. 154(b) by 653 days.

(21) Appl. No.: 12/312,527

(22) PCT Filed: Nov. 19, 2007

(86) PCT No.: PCT/FI2007/050620
§ 371 (c)(1),
(2), (4) Date: Aug. 14, 2009

(87) PCT Pub. No.: WO2008/062098
PCT Pub. Date: May 29, 2008

(65) Prior Publication Data
US 2010/0056106 A1    Mar. 4, 2010

(30) Foreign Application Priority Data
Nov. 20, 2006 (FI) .................................. 20065736

(51) Int. Cl.
H04M 1/66    (2006.01)
(52) U.S. Cl.
USPC ........................................................ 455/411
(58) Field of Classification Search
USPC ............ 455/410–411, 466, 426.1, 433, 435.1
See application file for complete search history.

(56) References Cited

U.S. PATENT DOCUMENTS

| | | | |
|---|---|---|---|
| 7,424,284 B2* | 9/2008 | Torvinen et al. | 455/411 |
| 7,551,926 B2* | 6/2009 | Rune | 455/435.1 |
| 7,724,904 B2* | 5/2010 | Lee et al. | 380/270 |
| 7,788,493 B2* | 8/2010 | Mononen et al. | 713/170 |
| 7,984,291 B2* | 7/2011 | Eronen et al. | 713/156 |
| 8,023,478 B2* | 9/2011 | Cam-Winget et al. | 370/338 |
| 2003/0226017 A1* | 12/2003 | Palekar et al. | 713/168 |
| 2004/0093522 A1 | 5/2004 | Bruestle et al. | |

(Continued)

FOREIGN PATENT DOCUMENTS

| | | |
|---|---|---|
| EP | 1 424 810 | 6/2004 |
| EP | 1 622 335 A1 | 2/2006 |

OTHER PUBLICATIONS

Kambourakis G. at al. "*Advanced SSL/TLS-based authentication for secure WLAN-3G interworking*" IEEE Proceedings Communications, vol. 151, No. 6, pp. 501-506, Oct. 2004.

(Continued)

*Primary Examiner* — Brandon Miller
(74) *Attorney, Agent, or Firm* — Cozen O'Connor

(57) ABSTRACT

A communications system comprising a radio access network for providing local wireless access for a mobile device and an authentication entity in a public land mobile network, wherein the authentication entity is arranged to authenticate the mobile device accessing the radio access network on the basis of authentication signalling between the authentication entity and the mobile device. The system includes a proxy entity via which transfer of the authentication signalling is arranged, and encapsulated transmission of the authentication signalling to and from the mobile device is arranged in messages of a cryptographic client-server transport layer encapsulation protocol between the mobile device and the proxy entity. The system provides encapsulated transfer of the authentication signalling to and from the authentication entity in messages of an AAA client-server protocol between the proxy entity and the authentication entity.

14 Claims, 2 Drawing Sheets

U.S. PATENT DOCUMENTS

| | | | | |
|---|---|---|---|---|
| 2005/0153684 | A1* | 7/2005 | Rodrigo | 455/411 |
| 2006/0002356 | A1* | 1/2006 | Barany et al. | 370/338 |
| 2006/0019635 | A1* | 1/2006 | Ollila et al. | 455/411 |
| 2006/0046693 | A1* | 3/2006 | Tran et al. | 455/411 |
| 2006/0052085 | A1* | 3/2006 | Gregrio Rodriguez et al. | 455/411 |
| 2006/0194578 | A1* | 8/2006 | Zhang | 455/435.2 |
| 2006/0199580 | A1* | 9/2006 | Zhang | 455/432.1 |

OTHER PUBLICATIONS

Chen J.-C. et al. "*Wireless LAN Security and IEEE 802.11i*" IEEE Wireless Communications, vol. 12, No. 1, pp. 27-36, Feb. 2005.

3GPP specification TS 33.234, v. 7.1.0 (Jun. 2006) "*Wireless Local Area Network (WLAN) interworking security*".

IETF RFC 4186: "*Extensible Authentication Protocol Method for Global System for Mobile Communications (GSM) Subscriber Identity Modules (EAP-SIM)*", H. Haverinen, J. Salowey, Jan. 2006.

IETF RFC 4187 "*Extensible Authentication Protocol Method for 3rd Generation Authentication and Key Agreement (EAP-AKA)*", J. Arkko, H. Haverinen, Jan. 2006.

3GPP specification TS 23.234 "*3GPP system to Wireless Local Area Network (WLAN) interworking*", version 7.2.0, Jun. 2006.

RFC 2284 "*PPP Extensible Authentication Protocol (EAP)*" L. Blunk, J. Vollbrecht, Mar. 1998.

RFC 2246 "*The TLS Protocol Version 1.0*", T. Dierks et al. Jan. 1999.

IETF Internet-Draft "*TLS Inner Application Extension (TLS/IA) draft-funk-tls-inner-application-extension-03.txt*", Funk et al, Jun. 25, 2005, 37 pages.

RFC 3588 "*Diameter Base Protocal*" P. Calhoun et al. Sep. 2003.

RFC 2865 "*Remote Authentication Dial in User Service (RADIUS)*" C. Rigney et al. Jun. 2000.

"Universal Mobile Telecommunications System (UMTS) 3G Security; Wireless Local Area Network (WLAN) Interworking security (3GPP TS 33.234 version 6.8.0 Release 6); ETSI TS 133 234", IEEE, LIS, Sophia Antipolis Cedes, France, vol. 3-SA3, No. V6.8.0, Mar. 1, 2006, XP014033965, ISSN: 0000-0001.

\* cited by examiner

AUTHENTICATION IN MOBILE INTERWORKING SYSTEM

PRIORITY CLAIM

This is a U.S. national stage of application No. PCT/FI2007/050620, filed on 19 Nov. 2007. Priority is claimed on the following application: Country: Finland, Application No.: 20065736, Filed: 20 Nov. 2006, the content of which is/are incorporated here by reference.

FIELD OF THE INVENTION

The present invention relates to arranging authentication in a mobile interworking system.

BACKGROUND OF THE INVENTION

Wireless local area networks (WLANs) are widely used to provide local wireless connectivity and, in particular, wireless access to the Internet. Interworking between. WLANs and public land mobile networks (PLMNs), has also been developed. In 3GPP (Third Generation Partnership Project) interworking features have been specified between 3GPP system and WLANs, these including Access, Authentication and Authorization (AAA) services for the 3GPP-WLAN Interworking System based on 3GPP subscription. Access may be provided to a locally connected IP network, such as the Internet, if allowed by the 3GPP subscription. Further, WLAN user terminals or devices (UE; User Equipment) may be provided with IP bearer capability for an operator's network and packet-switched (PS) services, if allowed by the 3GPP subscription.

An AAA server in the 3GPP network may perform authentication of a 3GPP subscriber accessing the WLAN. 3GPP specification TS 33.234, v. 7.1.0 (2006-06) *"Wireless Local Area Network (WLAN) interworking security"* describes procedures for arranging WLAN access authorization based on authentication by an AAA server of a 3GPP system.

IETF RFC 4186: *"Extensible Authentication Protocol Method for Global System for Mobile Communications (GSM) Subscriber Identity Modules (EAP-SIM)"*, H. Haverinen, J. Salowey, January 2006, specifies an authentication protocol for authenticating and session key distribution using a Global System for Mobile Communications (GSM) Subscriber Identity Module (SIM). IETF RFC 4187 *"Extensible Authentication Protocol Method for 3rd Generation Authentication and Key Agreement (EAP-AKA)"*, J. Arkko, H. Havernen, January 2006, specifies an EAP mechanism for authentication and session key distribution that uses the Authentication and Key Agreement (AKA) mechanism used in 3rd generation mobile networks called Universal Mobile Telecommunications System (UMTS) and CDMA2000. Both of these EAP based mechanisms may be used in a 3GPP WLAN interworking system to authenticate a terminal (supporting such a mechanism) accessing a WLAN.

A legacy IEEE 802.11 authentication mechanism (shared key authentication) working on medium access control MAC layer is not considered very useful. IEEE (802.11i Task Group TGi) has developed enhancements to WLAN security and selected IEEE 802.1X as an authentication framework. The 802.1X is a standard for port-based access control in which EAP messages are used for end-to-end authentication between a WLAN terminal and an Authentication Server (AS), such as a Radius server.

One problem with the current solutions is that many local access networks do not support sophisticated access control mechanisms, such as the IEEE 802.1X.

BRIEF DESCRIPTION OF THE INVENTION

An enhanced solution is now provided for arranging authentication in an interworking system comprising a local radio access network and a PLMN. This solution may be achieved by a method, an electronic device, a computer program product, and a system which are characterized by what is disclosed in the independent claims. Some embodiments of the invention are set forth in the dependent claims.

According to an aspect of the invention, a system, providing authentication of a mobile device accessing a radio access network via a local radio access network by an authentication entity in a public land mobile network, comprises a proxy entity via which transfer of authentication signalling messages between the mobile device and the authentication entity is arranged. The system is arranged to provide encapsulated transmission of the authentication signalling messages between the mobile device and the authentication entity to and from the mobile device in messages of a cryptographic client-server transport layer encapsulation protocol between the mobile device and the proxy entity. The system is further arranged to provide encapsulated transfer of the authentication signalling messages between the mobile device and the authentication entity to and from the authentication entity in messages of an AAA client-server protocol between the proxy entity and the authentication entity. The term 'cryptographic transport layer protocol' is to be understood broadly to refer to any encapsulation protocol operating above a transport layer protocol, such as the Transport Control Protocol TCP, or provided by a transport layer protocol, for instance in view of the ISO protocol model.

In one embodiment of the invention, a transport layer security (TLS) Record protocol is used for encapsulating and decapsulating authentication signalling messages between the mobile device and the authentication entity.

In a further embodiment, the radio access network visited by the terminal is a wireless local area network comprising an access controller and at least one access point. The access controller is arranged to forward messages of a cryptographic client-server transport layer encapsulation protocol between the mobile device and the proxy entity and the proxy entity is arranged to inform the access controller (24) on the of result of the authentication. Further, the access controller is arranged to allow or deny access via the radio access network on the basis of the information from the proxy entity.

In still a further embodiment of the invention, the proxy entity is arranged to use remote authentication dial in user service Radius protocol or Diameter protocol for encapsulating and decapsulating authentication signalling messages to and from the authentication entity.

One advantage of the present solution is that the authentication signalling messages may be transferred between the mobile device and the local network by utilizing a secure transport layer client-server encapsulation protocol. It is not necessary to implement specific wireless local access specific cryptographic procedures, such as the IEEE 802.1X, but encapsulation protocols already being commonly used, in particular the TLS, may be used for delivering authentication signalling to/from the terminal. The present use of the proxy entity enables such a change in the underlying protocol to be hidden from the PLMN side. Thus, no changes are necessary in the AAA entity of the PLMN to support terminals not supporting the same encapsulation protocol as the AAA entity for authentication signalling. Furthermore, by providing a specific proxy entity, it is not necessary to support an authentication signalling protocol, such as the EAP, in the local access network elements, such as WLAN access points and access controllers.

BRIEF DESCRIPTION OF THE DRAWINGS

In the following, the invention will be described in further detail by means of some embodiments and with reference to the accompanying drawings, in which.

DETAILED DESCRIPTION OF EMBODIMENTS

In the following examples, the communications system is based on a WLAN/3GPP interworking system without, however, limiting the invention to such a particular system. The invention can be used in any telecommunication system where PLMN authentication services are applied for access control in a local access network. For instance, the local access network may be any IEEE 802-based wireless local area network. For instance, the local access network may be an IEEE 802.11 (Wifi) or 802.16 (or Wimax) based network. However, the invention may also be applied to other types of local networks via which access to PLMN may be arranged, such as networks operating at unlicensed frequency bands, such as a network according to a BRAN (Broad-band Radio Access Networks) standard, a Home RF network, or a Bluetooth network. One further example is 3GPP generic access network GAN (or previously known as unlicensed mobile access UMA) based access enabling access via a general (IP based) access network to A/Gb interfaces of a 3GPP core network.

Figure 1:
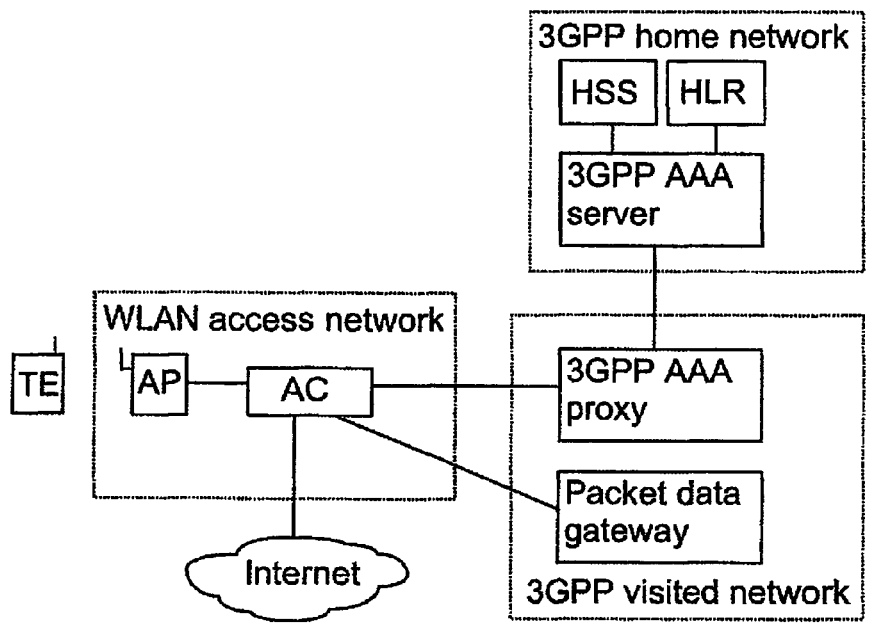
FIG. 1 is a block diagram illustrating a roaming WLAN interworking model.

FIG. 1 illustrates a roaming WLAN-3GPP interworking model. An access point AP providing wireless access to a WLAN terminal device TE controls a radio interface in accordance with the radio technology used, in the present embodiment in accordance with IEEE 802.11 or 0.16 standard. The IEEE 802.11 specifications determine protocols of both a physical layer and a MAC layer for data transmission over the radio interface. Any one of the current or future IEEE WLAN techniques may be used. For instance, one of the following IEEE 802.11 protocols may be used: 802.11, 802.11a, 802.11b, 802.11g, 802.11n. Spread spectrum technology is applied, and currently applied bands are 2.4 GHz and 5 GHz.

The access point AP bridges radio interface data flows or routes data flows to other network nodes, such as other access points or routers R, and from other network nodes. One or more access points are connected to an access controller AC transferring information to external IP based networks, such as the Internet. Further details on WLAN techniques are available on the IEEE specifications at the IEEE web site.

In the example of FIG. 1 the AC also provides functionality for access to a 3GPP system, but a separate (gateway) device may be provided for 3GPP access. The WLAN access network may be connected to a 3GPP AAA server or proxy via the Wa interface and to packet data gateway via a WLAN access gateway WAG.

FIG. 1 illustrates 3GPP system components in a roaming situation, i.e. when the 3GPP network connected by the accessed WLAN access network is a visited 3GPP network (visited PLMN; VPLMN). Hence, to authenticate a subscriber, a 3GPP access, authentication and authorization AAA proxy connected to the local WLAN access network relays the AAA signalling between the WLAN access network and an AAA server in a subscriber home network (Home PLMN; HPLMN). The AAA server in the subscriber home network is connected if 3GPP authentication of a terminal TE is desired. The AAA server retrieves authentication information from a home location register/home subscriber server HLR/HSS of the 3GPP subscriber's home 3GPP network. The AAA server then authenticates the 3GPP subscriber based on the retrieved authentication information and communicates authorization information to the WLAN. It is to be noted that many further elements exist in 3GPP system that are not related to authentication of a subscriber accessing a WLAN, but the description of such further elements is omitted herein. For more information on the WLAN-3GPP interworking system elements, reference is made to the 3GPP specification TS 23.234 "*3GPP system to Wireless Local Area Network (WLAN) interworking*", version 7.2.0, June 2006.

WLAN Access Authorization defines processes in a 3GPP AAA server verifying whether WLAN access should be allowed to a subscriber and deciding what access rules should be applied to a subscriber. It is the stage after access authentication, but before service authorization and a WLAN terminal's local IP address allocation. After a successful authentication process additional conditions for the 3GPP AAA server could be provided to decide whether access is allowed and what access rules/policy should be applied. These conditions may be based on the subscriber's profile, account status, O&M rules, local agreements or information about the WLAN access network.

WLAN authentication signalling for 3GPP-WLAN interworking is based on Extensible Authentication Protocol (EAP) specified in RFC 2284. Reference is made to the 3GPP TS 33.234, v. 7.1.0 (2006-06) "Wireless Local Area Network (WLAN) interworking security", and particularly to Chapter 6.1.1 for USIM based WLAN access authentication based on the EAP AKA procedure and to Chapter 6.1.2 for SIM based WLAN access authentication based on the EAP SIM procedure. The EAP AKA procedure is specified in RFC 4187, January 2006: "Extensible Authentication Protocol Method for 3rd Generation Authentication and Key Agreement (EAP-AKA)", and EAP SIM procedure is specified in RFC 4186, January 2006: "Extensible Authentication Protocol Method for Global System for Mobile Communications (GSM) Subscriber Identity Modules (EAP-SIM)".

Figure 2:
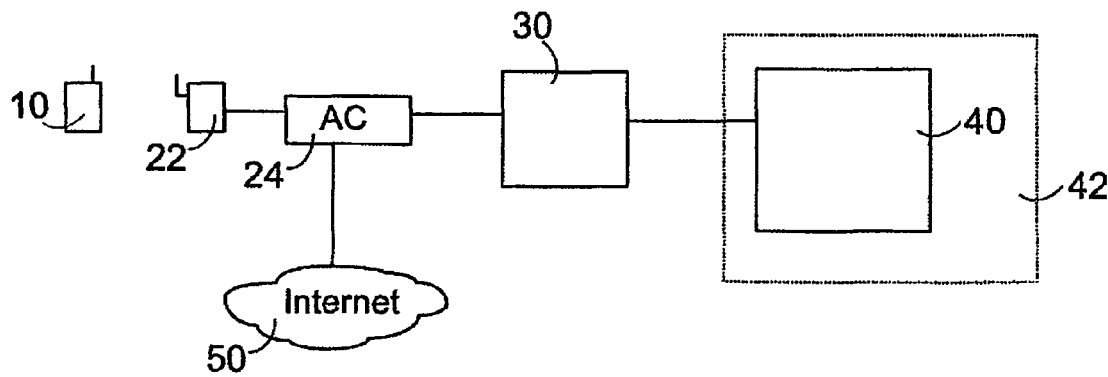
FIG. 2 is a block diagram Illustrating an architecture according to an embodiment of the invention.

FIG. 2 illustrates a network architecture according to an embodiment. A terminal device 10 accessing a WLAN may, for instance, be an integrated communication device, a PDA device, or a laptop computer, combined with an apparatus offering radio access (such as a WLAN card). In the present embodiment, the terminal 10 comprises a WLAN transceiver and functionality to communicate authentication signalling for 3GPP system based authentication. For this purpose, the terminal 10 may comprise a subscriber identity module SIM or a UMTS subscriber identity module USIM stored on an IC card (may be referred to as SIM card or UICC, respectively), an IC card reader and suitable software for accessing the SIM/USIM and signalling to the network.

The terminal 10 may further comprise means for accessing 3GPP services via the local WLAN and/or via a cellular 3GPP access network, such as a base station system BSS, GSM/EDGE radio access network GERAN, or UMTS terrestrial radio access network UTRAN. Hence, the terminal 10 may be, from the point of view of the 3GPP system, User Equipment UE or a mobile station MS accessing 3GPP services via the local access network. Thus, the terminal 10 is arranged to communicate with a packet data gateway over the 3GPP system interface Wu. However, it is to be noted that the terminal 10 may be capable of WLAN access only, and the 3GPP system based authentication is applied for access control to local WLAN access network and the Internet.

The reference terminal 10 is used herein broadly to refer to the user equipment and it may consist of several devices. When there is more than one, there will be typically WLAN Terminal Equipment (e.g. a laptop) and a Mobile Terminal MT (e.g. a mobile phone) equipped with a USIM or SIM. The WLAN TE provides WLAN access, while the MT implements the authentication as the authentication signalling termination (by EAP), which includes key derivation and identity handling. The termination point of EAP is the MT or UICC. When an authentication process is finished (in the MT or UICC), the resulting keys can be retrieved by the WLAN TE in order to be used for link layer security in the WLAN access.

A proxy entity or node 30 is provided in the system such that authentication signalling between the terminal device 10 and an authentication entity 40 is arranged via the proxy entity 30. The authentication entity 40 may be a 3GPP AAA server or proxy in the 3GPP-WLAN Interworking embodiment. The proxy entity 30 and the terminal device 10 are arranged to apply, for transfer of authentication signalling messages between the authentication entity 40 and the terminal 10, a specific (access) encapsulation protocol between the terminal device 10 and the proxy entity 30. In particular, the access encapsulation protocol is access network dependent and may be provided on or above the transport protocol layer. Furthermore, the proxy entity 30 is arranged to apply an AAA client-server protocol between the proxy entity 30 and the authentication entity 40, i.e. in one embodiment between the WLAN access network and the 3GPP system (AAA server/proxy). In other words, the proxy entity 30 is arranged to provide transfer of authentication signalling between the authentication entity 40 and the terminal 10 by utilizing at least two different underlying encapsulation protocols. It is to be noted that the system of FIG. 2 is only one example, and there may be other and/or additional networks and elements, some of such embodiments being also indicated below.

In one embodiment, the authentication signalling between the authentication entity 40 and the terminal 10 is based on the EAP applying EAP Request/Response messages. Thus, the proxy entity 30 is arranged to receive an EAP message encapsulated in accordance with the access encapsulation protocol, decapsulate the EAP message, encapsulate the EAP message in accordance with the AAA client-server protocol, and transmit the encapsulated EAP message to the 3GPP AAA server/proxy. In the following, further embodiments are illustrated in which the authentication signalling is based on use of EAP. However, the application of the present features are not limited to any specific authentication signalling protocol, but messages of other protocols may be transferred utilizing a similar underlying transfer arrangement by the proxy entity 30.

In one embodiment, the access encapsulation protocol is a transport layer security TLS protocol. The TLS protocol is specified in RFC 2246, "*The TLS Protocol Version* 1.0", January 1999. In this embodiment, the terminal device 10 comprises a TLS client and the proxy entity 30 comprises a TLS server. The access controller 24 is arranged to forward TLS traffic (which appears as HTTPS traffic) to the proxy entity 30. Hence, there is no need to support EAP in the access network comprising access points 22 and access controllers 24. TLS facilitates a generic method for transferring data as encapsulated as part of the base protocol, and this is utilized in the terminal 10 and the proxy entity 30. The proxy entity 30 is arranged to decapsulate or disassemble in the TLS AVPs (attribute-value pair) created by the TLS protocol entity of the terminal 10. Also further methods may be applied. For instance, the terminal 10 and the proxy entity 30 may be arranged to apply an "inner application" extension of TLS as described in IETF Internet-Draft "*TLS Inner Application Extension (TLS/IA) draft-funk-tls-inner-application-extension-03.txt*", Funk et al, Jun. 25, 2005, 37 pages, for secure tunnelled transfer of EAP messages.

The transport of authentication signalling between the proxy entity 30 and the 3GPP AAA entity 30, e.g. over the Wa reference point, is in one embodiment based on Diameter (RFC 3588).

In another embodiment, a RADIUS (RFC 2865) protocol is applied between the proxy entity 30 and the 3GPP AAA entity 40, but also other protocols may be applied.

In the above embodiments, the proxy entity 30 thus comprises a RADIUS or Diameter protocol entity, respectively. The proxy entity may thus be configured to function as a RADIUS client or a Diameter client. The proxy entity 30 may be configured to perform (a direct or non-direct) protocol conversion between the access encapsulation protocol (e.g. the TLS protocol) and RADIUS or Diameter protocol for EAP messages.

The proxy entity 30 may reside in the local (WLAN) access network or it may be connected via the local access network. In this embodiment the reference 42 refers to PLMN (VPLMN or HPLMN), and the transport of authentication signalling between the WLAN access network and the 3GPP AAA proxy/server, i.e. over the Wa reference point, may thus use Diameter (RFC 3588) or RADIUS (RFC 2865) (but also other protocols may be applied), and no changes to the PLMN network are necessary. In one embodiment, the proxy functionality could be implemented in a device functioning as the authenticator in the WLAN access network, which may be the AC 24.

In one embodiment, the proxy entity 30 is a PLMN network element which is connected by the local access network. In other words, the proxy functionality may be part of a 3GPP network connected to the WLAN access network. The proxy entity 30 may be arranged by, or in connection with, a 3GPP AA server and/or proxy element, or implemented in another network element connectable to the non-PLMN access network. In this embodiment, no specific equipment for implementing the change in encapsulation protocol is necessary for WLAN access networks or intermediary networks between the WLAN access network and the PLMN, but it is possible to apply a protocol, such as the TLS, commonly used in such access networks.

When the proxy entity 30 is implemented by the AAA server, in a non-roaming situation the AAA server may thus terminate the secure encapsulation protocol used by the terminal 10 to transfer the EAP messages. However, such a network element may still provide the additional functionality to terminate the secure encapsulation protocol used by the terminal 10, and possibly provide EAP messages to the AAA server functionality in an appropriate format.

In one embodiment, the proxy entity 30 is provided by a 3GPP AAA proxy. In this embodiment the reference 42 illustrates a HPLMN including an AAA server (40). Hence, the proxy entity 30 may serve terminals 10 accessing a WLAN access network connected to a VPLMN, and directly adapt transfer of authentication signalling to use an appropriate AAA client-server protocol towards the AAA server in the HPLMN.

It is also possible to implement the proxy entity 30 in an intermediate network between the WLAN access network and the PLMN. There may be further network elements besides the entities illustrated in FIG. 2. For instance, there may be an AAA proxy to relay AAA information between the proxy entity 30 and the 3GPP AAA server. It is also to be noted that data transfer in the fixed network to and from the access point 22 or the AC 24 may be arranged in various ways. In one embodiment, a 3GPP and EAP based authentication system may be arranged in an xDSL based system without specific support for a sophisticated authentication procedure, such as the IEEE 802.1X.

The access controller AC 24 may be an authenticator for the local network access and allow access to the Internet 50 as a response to a successful authentication by the 3GPP AAA server. Hence, the AC 24 may also participate in the EAP signalling. In another embodiment, the proxy entity 30 functions as the authenticator for the local network access.

In one embodiment, the proxy entity 30 is arranged to control the access controller 24. If the proxy entity 30 functions as the authenticator, it may control the AC 24 to enable or prevent access for the terminal 10 on the basis of a result of the 3GPP authentication procedure.

Figure 3:
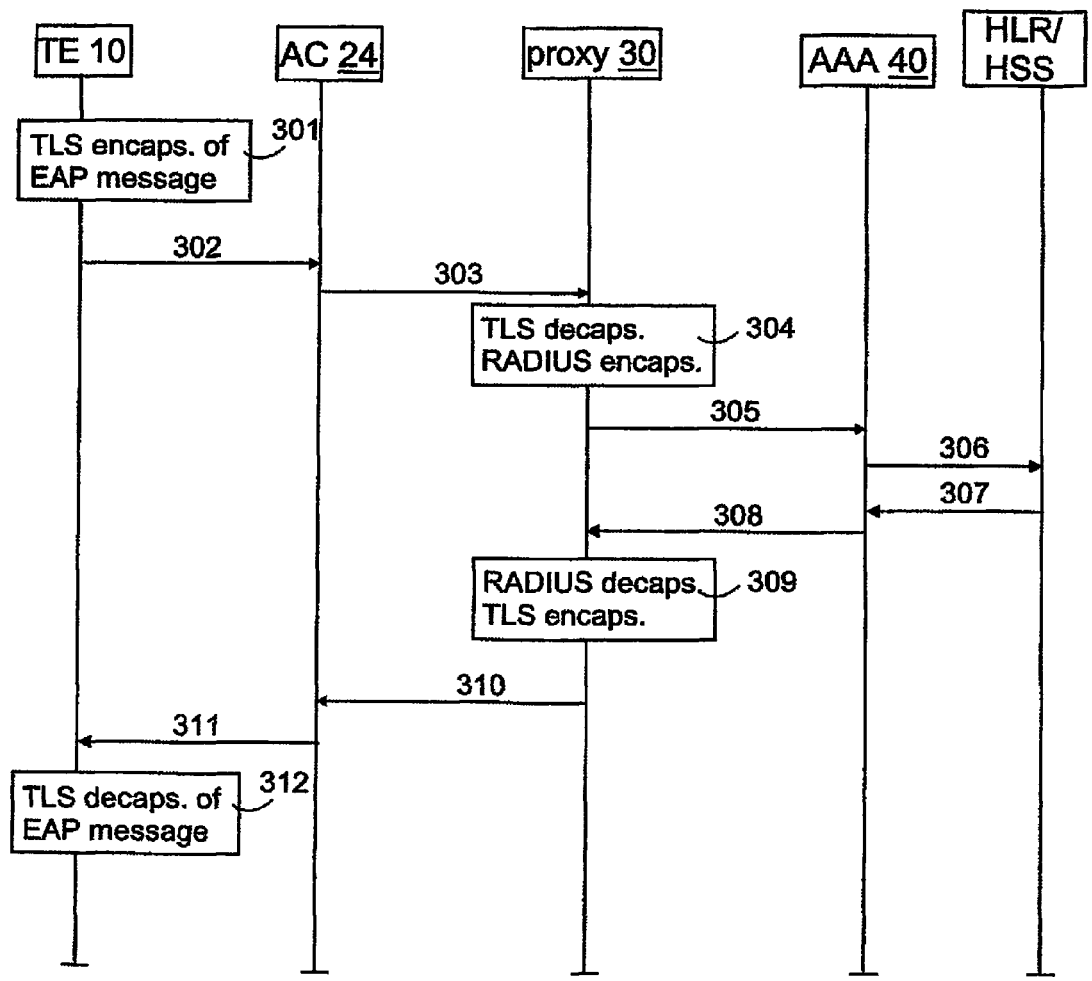
FIG. 3 is a signalling chart illustrating authentication signalling transfer according to an embodiment of the invention.

FIG. 3 illustrates authentication signalling according to an embodiment of the invention in a 3GPP-WLAN environment where TLS and Radius are applied to transfer of EAP based authentication messages. An EAP message needs to be transferred from a terminal 10 connected to a WLAN to an AAA server or proxy 40 in a PLMN network. In step 301, the EAP message is encapsulated to a TLS message, i.e. a TLS protocol specific header is added. The terminal 10 initiates access establishment to the AAA server 40 in the home network by the TLS protocol, i.e. to a TLS server in from the point of view of the terminal. The access establishment may be seen as an ordinary secure hypertext transfer protocol HTTPS connection establishment. However, it is to be noted that HTTP(S) is not necessary, and terminal 10 may, but does not have to, support HTTP based Web login.

The message is transmitted 302 to the access controller 24 by utilizing the transmission services of the local wireless access. The AC 24 forwards 303 the message to the proxy entity 30, which is arranged to function as a TLS server and, in the present embodiment, terminates the TLS connection from the terminal 10.

It is to be noted that TLS message exchange is provided between the terminal 10 and the TLS server 30 in accordance with the TLS protocol, such as certificate approval, which is not illustrated in FIG. 3. The TLS Record protocol used on top of a reliable transport protocol, such as the TCP, for encapsulation of upper layer messages is described in Chapter 6 and the TLS Handshake in Chapter 7 of the RFC 2246.

In response to the message 303, the proxy entity 30 initiates a Radius procedure with the 3GPP AAA entity 40. The proxy entity 30 in step 304 decapsulates the received message to recover the original EAP message and encapsulates the EAP message in accordance with the Radius encapsulation format. Radius procedures, packet formats, packet types and attributes are specified in the RFC 2865, and are not illustrated in FIG. 3. The proxy entity 30 is hence arranged to function as a TLS server and a Radius client. It is to be noted that Radius is run over UDP, and the proxy node 30 is arranged to use UDP as a transport protocol instead of TCP towards the AAA entity 40 functioning as the Radius server. Hence, the proxy node 30 is also arranged to use different transport layer protocols for EAP message transfer.

The EAP message encapsulated in accordance with Radius is transmitted 305 to the 3GPP AAA entity 40, which decapsulates the received packet. In the present embodiment, the AAA entity 40 requests 306 and receives 307 authentication information from a HLR or HSS of the subscriber. An EAP response message is encapsulated in a Radius packet and transferred 308 to the proxy entity 30. The proxy entity 30 terminates the Radius protocol and decapsulates the received message in step 309. Further, since the message is to be transmitted to the terminal 10, the proxy entity 30 encapsulates the EAP message in accordance with the TLS protocol and transmits 310 the message to the AC 24. The AC 24 forwards 311 the TLS message to the terminal 10, which decapsulates 312 the TLS message, and the EAP message is submitted to an EAP entity in the terminal 10 for further processing.

It is to be noted that the signalling diagram of FIG. 3 is simplified and that the authentication procedures may involve transfer of several (rounds of) EAP messages. Further, operations in the terminal device 10 involving also the SIM/USIM card are not illustrated in detail in FIG. 3. For instance, it is even possible to terminate the EAP signalling in the SIM/USIM card (UICC); for a more detailed illustration of a possible functional split within the terminal 10 reference is made to Chapter 6.7 of the above-mentioned 3GPP specification TS 33.234. However, as already illustrated, after necessary information for an EAP message is created (e.g. partly by the SIM/USIM), the lower layer transmission of EAP messages is then arranged as already illustrated by utilizing the TLS or another secure transport layer encapsulation protocol. The actual 3GPP-WLAN authentication procedure and EAP messages may be arranged as specified in the 3GPP specification TS 33.234; Chapter 6.1.1 describing the USIM based WLAN access authentication based on the EAP AKA procedure and Chapter 6.1.2 describing the SIM based WLAN access authentication based on the EAP SIM procedure.

The proxy entity 30 may be the authenticator, in which case it may modify the received (308) EAP message and/or form an EAP message. Hence, the proxy entity 30 may be arranged to start the EAP Exchange/Request procedure with the terminal 10, as Illustrated for instance in FIG. 4 of the TS 33.234. Further, the proxy node 24 may thus either explicitly inform the AC 24 of the outcome of the authentication, or the AC 24 is arranged to monitor the TLS traffic and define the outcome of the authentication. The AC then either allows access for the terminal 10 or forbids it access. In another embodiment, the AC 24 is functioning as the authenticator, and the proxy node 24 merely provides the underlying protocol exchange related features for EAP message transfer.

In the case of a roaming situation, the AAA entity 40 is an AAA server in a home PLMN of the terminal 10. The proxy entity 30 may be a 3GPP AAA proxy in the visited PLMN, or a further 3GPP AAA proxy is used for delivering EAP/Radius messages between the proxy entity 30 and the AAA server 40 (not illustrated in FIG. 3). In this embodiment, the terminal 10 provides an identifier of the home PLMN, on the basis of which the proxy node 30 (or the further 3GPP AAA proxy) is capable of forwarding the EAP messages to the AAA server 40 in the home PLMN. Any of the above-illustrated procedures may be applied for arranging transfer of such EAP messages between the terminal 10 and the 3GPP AAA server 40.

FIG. 3 only illustrates some authentication signalling message exchange in the system, and e.g. on the basis of the AAA signalling examples of the above-mentioned 3GPP specification 33.234 it is clear that various other signalling messages may be transferred in such a system. A similar change of underlying protocol may be performed on these other EAP messages passing the proxy node 30.

Figure 4A:
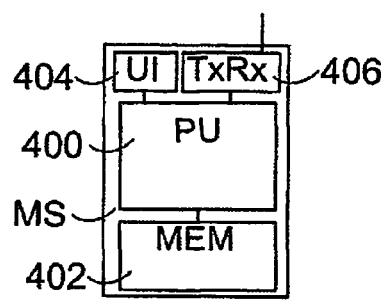
FIGS. 4a and 4b are block diagrams illustrating units of a user terminal and a device implementing a proxy entity.
Figure 4B:
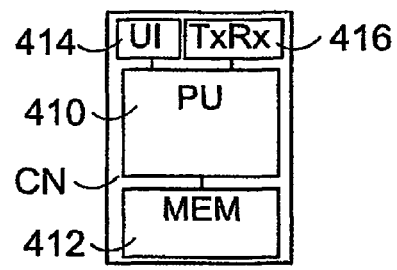

As illustrated in FIGS. 4a and 4b, the terminal 10 and the device implementing the proxy entity 30, respectively, typically comprise memory 402, 418, a transceiver 406, 416 for wireless data transmission, one or more processing units 400, 410, and a user interface 404, 414 of some form. Various applications can be implemented in the processing unit 400, 414 by executing a computer program code stored in the memory 402, 412. By means of a computer program code to be executed in the processing unit 410 and/or hardware solutions, it is possible to arrange the proxy entity device 30 to implement at least some of the embodiment relating to arranging transfer of authentication signalling between the terminal 10 and the AAA entity 40 by utilizing two different encapsulation protocols as illustrated above in connection with FIGS. 2 to 4. It is to be noted that the functions described above may be located in one network element, or some of them may be in one element and others in other elements, regardless of how they are located in the above exemplary embodiments. Computer program codes to be executed in the processing unit and/or the hardware solutions may be used for arranging the terminal 10 to implement the inventive functions relating to the use of TLS for EAP signalling, some embodiments of which were illustrated above.

The accompanying drawings and the description pertaining these to are only intended to illustrate the present invention. Different variations and modifications of the invention will be apparent to those skilled in the art, without departing from the scope of the invention defined in the appended claims. Different features may thus be omitted, modified or replaced by equivalents.

The invention claimed is:

1. A communications system comprising:
a radio access network for providing local wireless access for a mobile device,
an authentication entity in a public land mobile network, the authentication entity being configured to authenticate the mobile device accessing the radio access network based on authentication signalling messages between the authentication entity and the mobile device, authorization of access for the mobile device connected to the radio access network being arranged based on a result of the authentication, and
a proxy entity via which transfer of the authentication signalling messages between the mobile device and the authentication entity is arranged,
wherein the system is configured to provide encapsulated transmission of the authentication signalling messages between the mobile device and the authentication entity in messages of a cryptographic client-server transport layer encapsulation protocol between the mobile device and the proxy entity such that a TLS protocol specific header is added in a message, and
wherein the system is further configured to provide encapsulated transfer of the authentication signalling messages between the mobile device and the authentication entity in messages of an authentication, authorization, and accounting client-server protocol between the proxy entity and the authentication entity.

2. The system according to claim 1, wherein the mobile device and the proxy entity are configured to use a transport layer security TLS Record protocol for encapsulating and decapsulating the authentication signalling messages between the mobile device and the authentication entity.

3. The system according to claim 1, wherein the authentication entity and the mobile device are configured to apply an extensible authentication protocol EAP for the authentication signalling messages between the mobile device and the authentication entity, and EAP messages are encapsulated in accordance with the cryptographic client-server transport layer encapsulation protocol between the mobile device and the proxy entity and in accordance with the authentication, authorization, and accounting client-server protocol between the proxy entity and the authentication entity.

4. The system according to claim 1, wherein the authentication entity is an authentication proxy in a visited public land mobile network VPLMN or an authentication server in a home public land mobile network HPLMN, and
wherein the authentication procedure is arranged on the basis of subscriber information in a subscriber identity module connected to the mobile device and subscriber information in a subscriber information database connected by the authentication entity.

5. The system according to claim 1, wherein the radio access network visited by the terminal is a wireless local area network comprising an access controller and at least one access point,
wherein the access controller is configured to forward messages of a cryptographic client-server transport layer encapsulation protocol between the mobile device and the proxy entity,
wherein the proxy entity is configured to inform the access controller on the of result of the authentication, and
wherein the access controller is further configured to allow or deny access via the radio access network based on the information from the proxy entity.

6. The system according to claim 1, wherein the proxy entity is configured to use remote authentication dial in a user service Radius protocol or a Diameter protocol for encapsulating and decapsulating authentication signalling messages to and from the authentication entity.

7. The system according to claim 1, wherein the proxy entity is a PLMN network element connected by the radio access network.

8. A method for arranging authentication signalling in a communications system comprising a radio access network for providing local wireless access for a mobile device, an authentication entity in a public land mobile network, and a proxy entity via which transfer of the authentication signalling is arranged, the method comprising:
authenticating the mobile device accessing the radio access network on the basis of authentication signalling messages between the authentication entity and the mobile device,
authorizing or refusing access for the mobile device connected to the radio access network based on a result of the authentication,
transferring the authentication signalling messages between the mobile device and the authentication entity encapsulated in messages of a cryptographic client-server transport layer encapsulation protocol between the mobile device and the proxy entity such that a TLS protocol specific header is added in a message, and
transferring the authentication signalling messages between the mobile device and the authentication entity encapsulated in messages of an authentication, authorization, and accounting client-server protocol between the proxy entity and the authentication entity.

9. A network element, comprising:

a proxy entity for arranging transfer of authentication signalling messages between a mobile device accessing a radio access network and an authentication entity in a public land mobile network, wherein the proxy entity is configured to apply a cryptographic client-server transport layer encapsulation protocol between the mobile device and the proxy entity such that a TLS protocol specific header is added in a message for at least one of transmitting and receiving authentication signalling messages between the mobile device and the authentication entity, and wherein the proxy entity is further configured to apply an authentication, authorization, and accounting client-server protocol between the proxy entity and the authentication entity for at least one of encapsulated transmission and reception of authentication signalling messages between the mobile device and the authentication entity.

10. The network element according to claim 9, wherein the proxy entity is configured to transfer extensible authentication protocol EAP messages by using the cryptographic client-server transport layer encapsulation protocol between the mobile device and the proxy entity and the authentication, authorization, and accounting client-server protocol between the proxy entity and the authentication entity.

11. The network element according to claim 9, wherein the proxy entity comprises a transport layer security LS Record protocol server for encapsulating and decapsulating the authentication signalling messages between the mobile device and the proxy entity.

12. The network element according to claim 9, wherein the network element is connectable to an access controller of a wireless local area network, and wherein the network element is configured to transmit and receive the message of a cryptographic client-server transport layer encapsulation protocol to and from the access controller, and wherein the network element is further configured to inform the access controller on a result of the authentication.

13. The network element according to claim 9, wherein the proxy entity is configured to use remote authentication dial in a user service Radius protocol or a Diameter protocol for encapsulating and decapsulating the authentication signalling messages to and from the authentication entity.

14. The network element according to claim 9, wherein the network element is a PLMN network element connectable to the radio access network.

\* \* \* \* \*